United States Patent [19]

Bores

[11] Patent Number: 4,801,220

[45] Date of Patent: Jan. 31, 1989

[54] SEAWALL, PIER, OR BASALT COLUMN LANDSCAPE

[76] Inventor: Pedro S. Bores, Vegafria 1, T.l., 28035 Madrid, Spain

[21] Appl. No.: 923,678

[22] Filed: Oct. 27, 1986

Related U.S. Application Data

[63] Continuation-in-part of Ser. No. 786,840, Oct. 11, 1985, abandoned.

[30] Foreign Application Priority Data

Oct. 28, 1985 [ES] Spain .................................... 289904

[51] Int. Cl.$^4$ ............................................. E02B 3/06
[52] U.S. Cl. ......................................... 405/31; 405/33
[58] Field of Search .................... 405/21, 26, 27, 30, 405/31, 33, 34, 284

[56] References Cited

U.S. PATENT DOCUMENTS 2,972,233 2/1961 Askevold ............................... 405/27
3,379,015 4/1968 Macks .
4,172,680 10/1979 Brown ............................... 405/30 X

FOREIGN PATENT DOCUMENTS 397926 5/1909 France .
618477 7/1978 U.S.S.R. .

Primary Examiner—David H. Corbin
Attorney, Agent, or Firm—Amster, Rothstein & Ebenstein

[57] ABSTRACT

A mosaic seawall comprises a fascine of vertically-elongated structural prisms of generally identical cross-section. Each of the elements has at least one lateral face abutting a lateral face of another of the prisms to define a common lateral face extending substantially the full vertical extent of at least one of the abutting prisms. A plurality of the prisms together define in cross-section a stable mosaic to resist overturning or sliding under the wave action, a plurality of the prisms together defining an echeloned or vertically stepped mosaic crest.

4 Claims, 8 Drawing Sheets

SEAWALL, PIER, OR BASALT COLUMN LANDSCAPE

This application is a continuation-in-part of U.S. Ser. No. 786,840, filed Oct. 11, 1985, now abandoned.

The invention refers to a seawall, pier, or basalt column landscape, i.e., a coastal structure (maritime, lake, river, etc.) designed to create sheltered areas for nautical use (marinas, ports, loading docks, etc.), residential use (lake towns, etc.), recreational use (marine parks, aquaparks, swimming pools, etc.), as well as for defense, stabilization and/or improvement of shorelines, either with shelves or level, with a fixed or mobile bottom, both ground plant level (seawalls, piers, on the bank, for channeling, support, or shelter) and in upright projection (seawalls, piers, for differential maintenance and/or shelter), modifying, dampening, or cancelling out the action of shore dynamics (waves, wakes of ships, currents, etc.), acting on shore processes (solid transportation, erosion, deposit) and/or constituting the land/water interface in a manner suitable for the above mentioned functions, with an increase and/or improvement of possible uses as well as esthetic and/or landscape qualities of the shore.

The patent according to this invention involves, in particular, a hexagonal prismatic face with preferably flat, preferably vertical or quasi-vertical lateral surfaces, and preferably horizontal or quasi-horizontal crest, mosaic-echeloned, the echelons being formed by one or more elements of the face, in a random or regular arrangement or a combination of both.

If required, the hexagonal prismatic face may have one or several superimposed or interposed beds, layers or strata, and include or not include possible depressions and/or projections on the mosaic echeloning, as well as take on surface texture and color or colors which are suitable for the overall SEAWALL or PIER, to simulate an extrusive igneous volcanic formation, such as those generated by basalt and/or similar rocks, with their "baths" and the alteration or not of beds, pourings, or column basalt with other beds, layers, strata, simulating cemented volcanic ash and/or effusive rocks of fluidal morphology.

Shore structures (seawalls, coastal piers, channeling, support, shelter, and maintenance) are at present taken care of by means of seawalls, piers, which may be manufactured vertical or mixed breakwaters, either natural, artificial, or monolithic.

All these types of vertical or mixed, conventional, breakwaters, seawalls, piers, project and are built to specifically fulfill the function for which they are designed: defense of the shore line, channeling, support, shelter, maintenance, and, in certain cases, mooring of vessels, being dimensioned to resist shore dynamics (waves, shipwakes, etc.). However, their morphology has especially been oriented towards fulfilling these functions, neglecting other possible uses and/or requirements, at present as valuable, such as their employment for recreational purposes, esthetic quality, adaptability to the landscape, etc.

Conventional monolithic, vertical and mixed seawalls, piers also have several additional drawbacks:

To too great an extent they reflect the gravity waves (waves, undertow, shipwakes, etc.) which greatly increases the restlessness of the water in front of the conventional seawalls, piers, generates cross-waves with repercussions on the support the beaches provide the seawall, pier, leads to resonances, etc., which makes both the use of the water surface and the adequate stability of the beaches difficult.

They are relatively unstable, since, being a quasi-rectangular superstructure, their tilting moment is not optimum.

Despite the inconveniences mentioned, and others, conventional seawalls, piers, have been built, and still are, as part of commercial and/or industrial, and even recreational, installations.

Undoubtedly, the basalt column landscape, seawall or pier is especially suited logically for volcanic coastlines, since their simulation of the most distinctive forms of this type of rock form allow it to be included in nature, without a contrast, without intruding, but rather as one more outstanding element of the latter.

The unquestionable structural, functional, environmental, and esthetic advantages of the seawall or pier which is the object of this invention, whose advantages we set forth below, compared to conventional shoreline structures as mentioned above, enable it to be used in a general way, regardless of the geological nature of the shore.

From the side, the seawall, pier, or basalt column landscape offers a very articulated outline, with preferentially vertical or quasi-vertical surfaces oriented in very diverse directions, forming inlets, caves, capes, etc. of as varied shapes and dimensions as one may wish.

The crest of the seawall, pier or basalt column landscape displays a mosaic echeloning whose echelons, formed by one or more elements of the face, improve stability by optimizing the location of the center of gravity of the seawall, pier or basalt column landscape, and/or the esthetic and/or functional qualities of the structure, as well as its employment by the users of the shoreline.

The seawall, pier, or basalt column landscape may be built by conventional methods, with floating caissons which include one or more prismatic elements, or with prefabs, either interlocking or not the various prismatic elements, which may or may not serve as shuttering. The floating caissons with three, four, seven, nineteen, etc. elements of the face constitute very convenient building solutions from a structural point of view.

If depth is slight, the seawall, pier, or basalt column landscape may be constructed on the spot with the corresponding shuttering. In any case, it is possible to combine two or more of these building methods and/or others.

Maintaining the suitable expansion joints, the different parts, formed by caissons, prefabs, built on the spot, of the seawall, pier, or basalt column landscape, shall preferably be joined by their upper part, allowing the unit or units of the various elements to behave as an interlocked unit or units.

The crest of the hexagonal prismatic face would thus act as a head or heads, the face constituting the entire superstructure of the seawall, pier, or basalt column landscape or being finished off by one or several elements of a preferably irregular shape, simulating remains of one or several basalt pourings which crest and/or joint all or part of the prismatic elements, at the same time as it can fulfull other functions as a breakwater, windbreaker, access routes, miradors, etc.

In cases where convenient, this or these irregularly shaped elements simulating fluidiform basalt pourings can not only be used on the crest of the prismatic network but can also be included in one or several levels of the entire part or parts of the crest, simulating volcanic stratigraphic series, where column basalts can alternate with fluidiform amorphous basalt pourings, with volcanic ash (lapilli), and/or volcanic rock.

The simulation of the volcanic landscape can be limited to the structural forms or extent to the micro-relief, external texture, and coloring of the superstructure of the seawall, pier, or basalt column landscape. The micro-relief of both the prismatic face and the amorphous volcanic beds (pourings, ash) can have the typical depressions, "baths", of column basalt and/or the rough, aggressive surface texture so typical of volcanic rock. When trying to simulate volcanic formations, the colors and shades of both the face and the superimposed and/or interposed beds should be like those of natural rock, either local or regional, or even, in the most special, most distinctive cases, of the volcanic world, in any case forming an esthetically and landscapewise outstanding unit, as volcanic formations sometimes are.

Like all conventional, vertical or mixed, monolithic seawalls, piers, the superstructure of the seawall, pier, or basalt column landscape will rest on one or several banquettes or on a submerged rockfill dike, whose crest is replaced by the seawall, pier, or basalt column landscape itself. Financial and/or building reasons will determine the solution to be adopted for the infrastructure.

The advantages of the seawall, or pier, which is the object of this invention are conventional seawalls or piers, are numerous and significant, and they do not refer only to structural and/or functional improvements, but also to aspects considered as valuable in present times, especially in residential, recreational, etc. environments, as the esthetic, landscape, etc. aspects, this invention providing a real and substantial advance in the field of Coastal Engineering.

In particular, the reduction of the wave reflection coefficient can be very great compared, especially, to vertical and mixed monolithic seawalls, piers, reaching values of less than 0.5.

The diagram of pressures being a function of the overtopping height, the height reached by the wave over the seawall, it is possible, if important, to either reduce cost height or, retaining the latter, increase the stability of the seawall. Any of these alternatives or any other intermediate alternative are an advantage, either financially or in terms of reliability.

An even greater functional advantage is involved in reducing the reflection coefficient because the restlessness of the water around the structure is reduced, due not only to the lesser height of the reflected wave, but also to the variety of directions of the reflected wave.

This happens not only on the sea side, but also in the inner areas (docks, holds, roadsteads, etc.), and prevents possible resonances and/or possible multiple reflections inside the latter. All of this involves the following additional advantages:

It allows better recreational use: (bathing, sailing, etc.) in the entire inner and outer area of same.

It simplifies mooring of vessels, although mooring is often recommended only in season.

It simplifies, if important, the support of possible beaches, which is problematic in the case of conventional seawalls, or piers.

The mosaic echeloning of the seawall, or pier which is the object of this invention allows the seawall itself to be used for recreational purposes: solarium, bathing, fishing, grandstand for watching spectacles or the scenery itself, walking, etc., at the same time as it provides access to and from the water: sea, river, lake, etc.

This type of recreational use substantially increases the appraisal value of the shoreline (maritime, lake, river, etc.), which provides an additional essential advantage over the present situation, particularly in certain cases in which, due to the absence of beaches and the special conditions of the natural coastline, the structure can provide for even the entire amount of areas.

Moreover, recreational use of the structure itself increases the possibilities of the shoreline, which not only improves the quantity, but also the quality of what is offered for recreation purposes.

All these advantages reflect directly on the profitability (financial, social, etc.) of the investment, reducing the cost/area ratio and increasing the quality of what is offered.

Undoubtedly, the most notorious advantage of the seawall, pier, or basalt column landscape, according to this invention, is the possibility of simulating the morphology and/or geological structure of volcanic nature, involving the execution of authentic volcanic coast landscape engineering, since it allows coastal dynamics and the geomorphology to be designed, very faithful simulating the morphology of volcanic formations with its caves, inlets, capes, "causeways", anchorages or "buffers", "baths", etc., which is an exceptional advantage, since volcanic formations, particularly those with column basalt, provide one of the most spectacular and beautiful examples of nature: Devil's Postpile National Monument in California; Giant's Causeway in Antrim County, Ireland; and the cliffs and caves of Fingal on the Island of Staffa.

The invention is explained in detail below, with reference to the drawings, which show:

FIG. 1 is a section of the seawall or pier, 1, constituted by elements, according to the invention, which have a polygonal-surface vertical facing 12, and an echeloned facing 13 compared to the conventional flat slope solution.

The prismatic elements which constitute the seawall, according to the invention, are shown as 14, which elements allow horizontal areas to be left in the flat base section as has been mentioned in the report.

Figure 1:
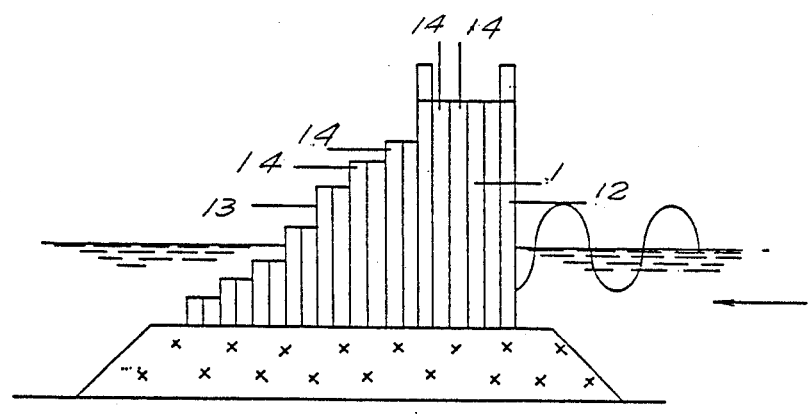
FIG. 1 is a side elevation view of a first embodiment of a seawall or pier section according to the present invention, disposed in a body of water.
Figure 2:
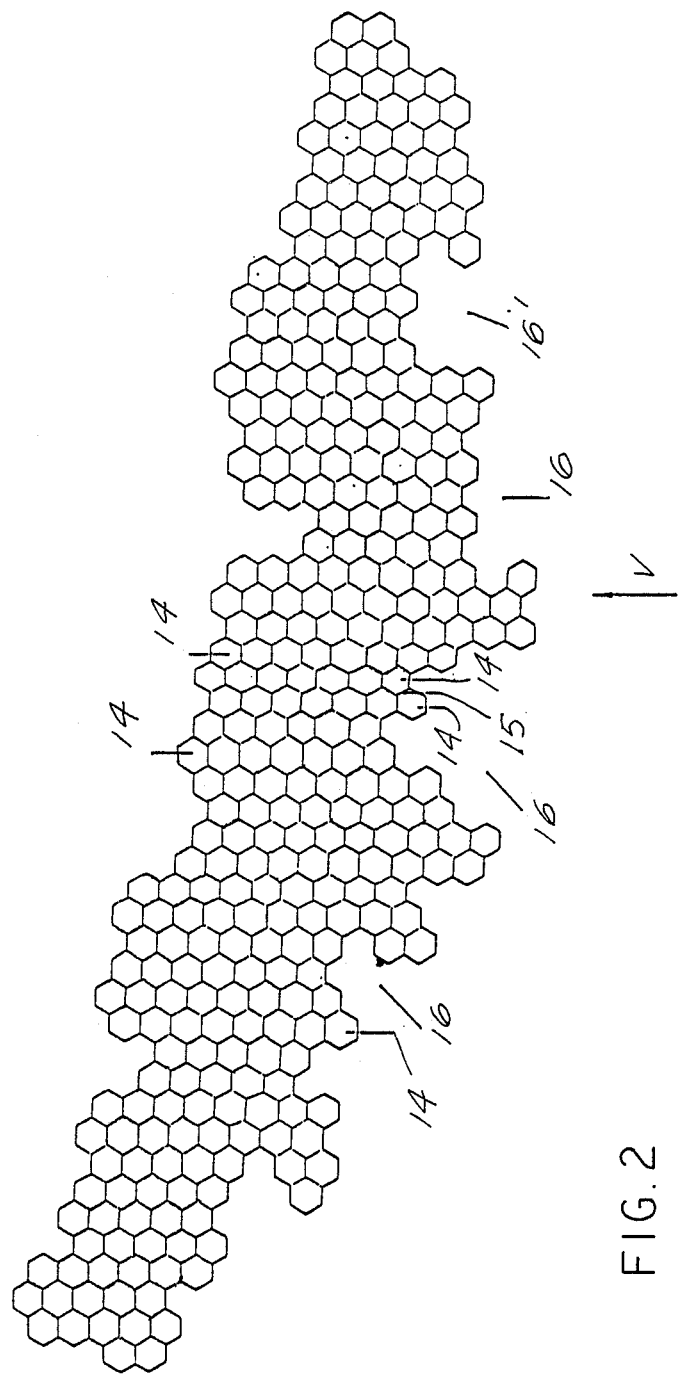
FIG. 2 is a top plan view thereof.

FIG. 2 shows a mosaic constituted by elements of hexagonal cross-section 14, with the surfaces of the lateral faces 15 making contact, seeking the resistant cooperation of these elements thus assembled, increasing to an unlimited extent its tilt resistance and the stability of the final structure.

The concavities 16 can be seen, formed in the outer facing, achieving the essential effects of anti-reflective surfaces with the advantages which can be inferred from reading this report. In the case of construction with floating caissons, several unified prismatic elements would be built, constituting integrated units which would cooperate with each other or with prismatic sections, constituting parts of the entirety of the mosaic.

Figure 3:
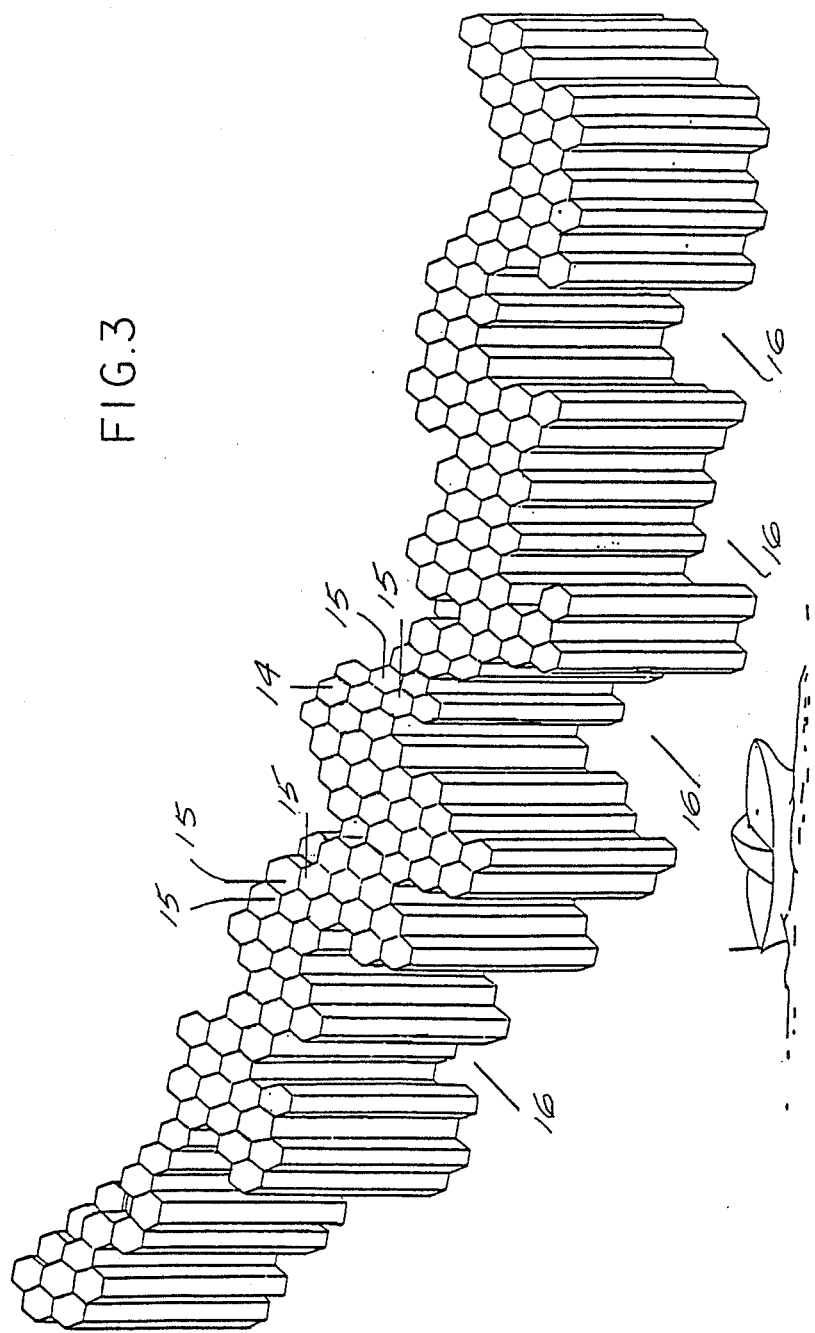
FIG. 3 is an isometric view thereof.

FIG. 3 shows an exonometric view of a seawall (pier) according to the invention, with its external surface with the concavities 16 left by the prismatic prefabs, providing the desired antireflective characteristics, showing, between the adjacent elements, the unions 15 joining the elements by their lateral surfaces. The same appearance could be achieved if it were made up of integrated units in the case of floating caisson construction, or construction in various blocks or a single block with external shuttering in keeping with the surface of the unitary prismatic elements.

Figure 4:
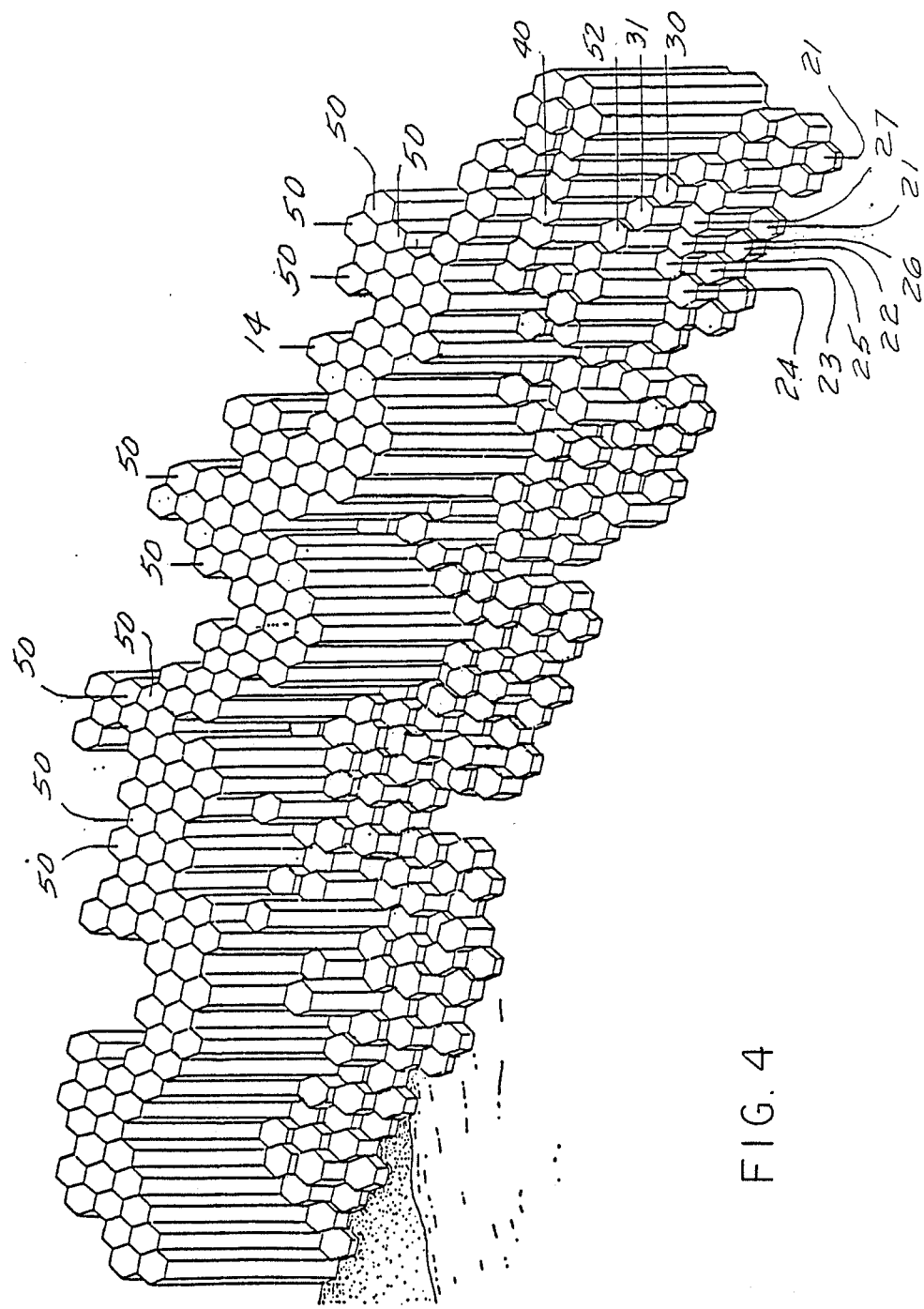
FIG. 4 is an isometric view of another embodiment thereof.

FIG. 4 shows an exonometric view of the seawall's inner area, beach area, port or waterside area, where the constitutive elements 14 are echeloned from the elements 14, designated 21, 22, 23 ... up to 50, representing the echeloned installation, thus allowing them to be used for transit or for permanence.

Figure 5:
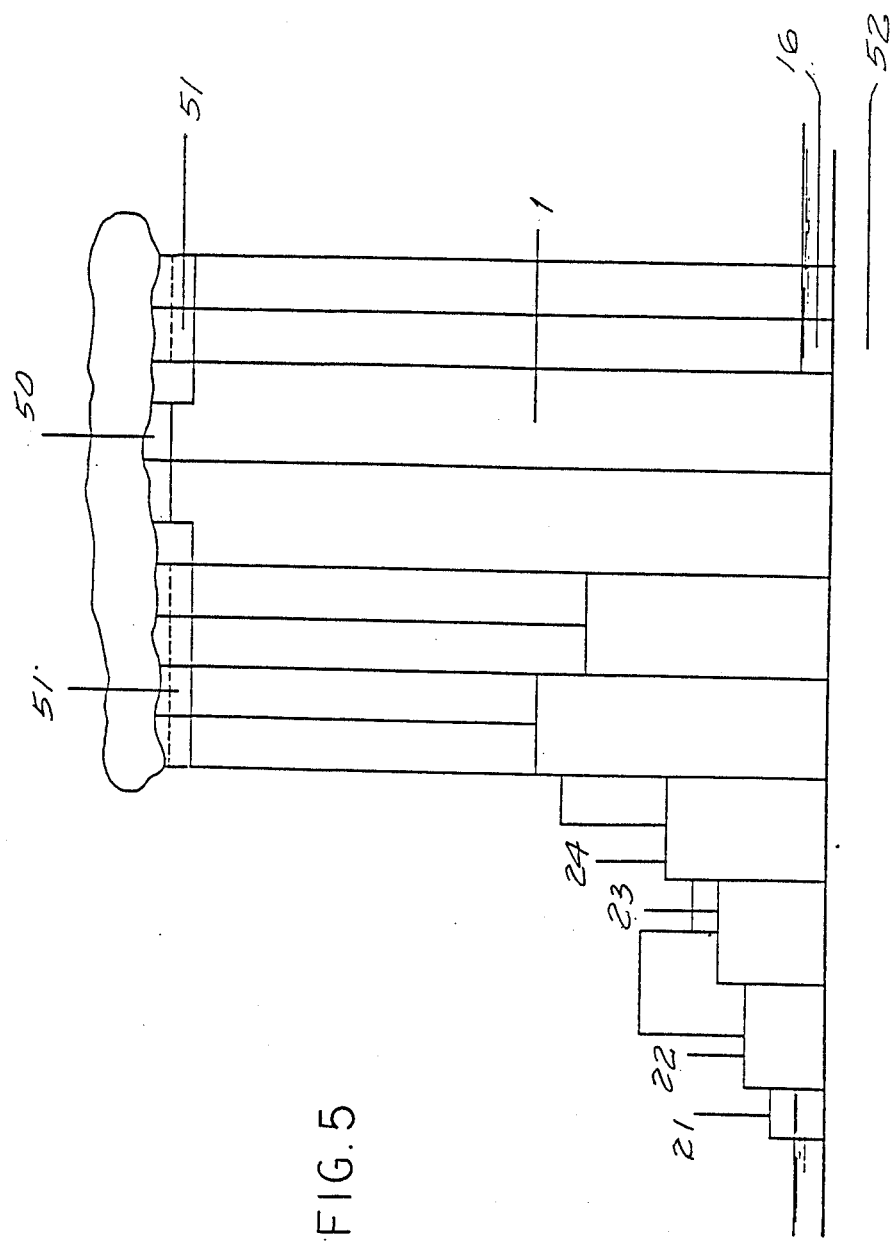
FIG. 5 is a side elevation view of another embodiment thereof.

FIG. 5 shows a section of the seawall, pier or basalt column landscape according to the invention. In this figure, concavities 16 may be seen on the outside, and the platform constitution 21, 22, 23 ... up to 50 in the inner echeloned area, constituting areas for recreational and/or transit use. Number 51 represents the joining systems, in the manner of a cap, of the prismatic elements, which are bedded on footing or banquettes 52.

Figure 6:
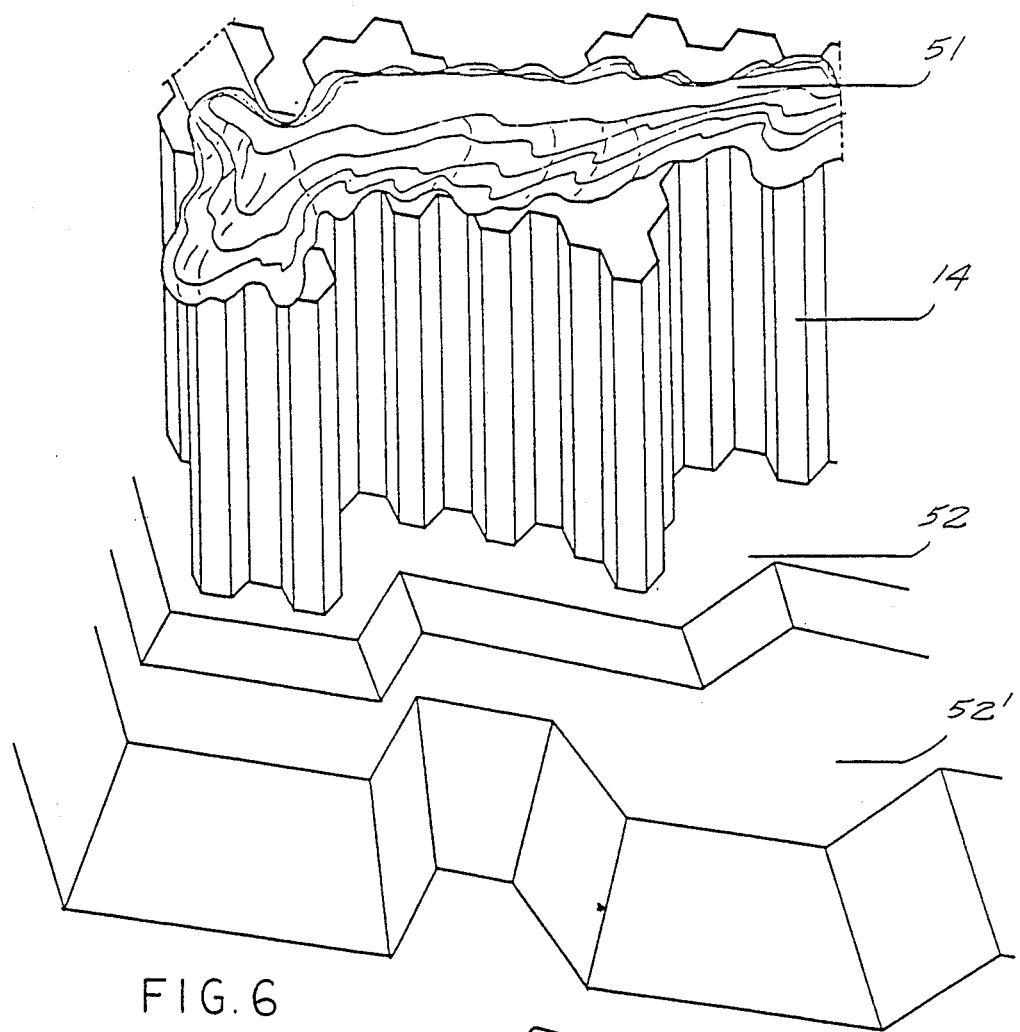
FIG. 6 is an isometric view of a further embodiment thereof.

FIG. 6 shows a partial element of the mosaic constituted by prismatic elements 14, or by integrated units 60, or by a block or parts of a block built with shuttering, whose surfaces would fit with the lateral surfaces of the prismatic pieces.

In this FIG. 6 we can see how a binding system is provided for as a cap 51, which can be used for walking, as a mirador, etc., and, if applicable, the bedding on foundation blocks 51 and 52 as support footing or banquettes.

Figure 7:
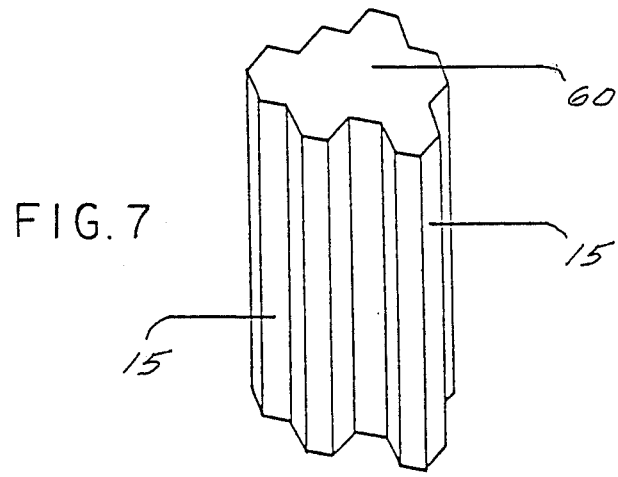
FIG. 7 is an isometric view of an integrated unit formed from the structural elements of the present invention.

FIG. 7 shows an integrated unit 60, according to the invention, constituted by the union of prismatic units 14, when the seawall is built by the floating caisson system or, if relevant, by shuttering. In either case the walls 15 correspond to those of the prismatic element and are structured in such manner that, if pertinent, the integrated units may be coupled with each other or they may be coupled with the prismatic elements, in such manner that, as they make up the seawall, they achieve the objectives of the present invention.

Figure 8:
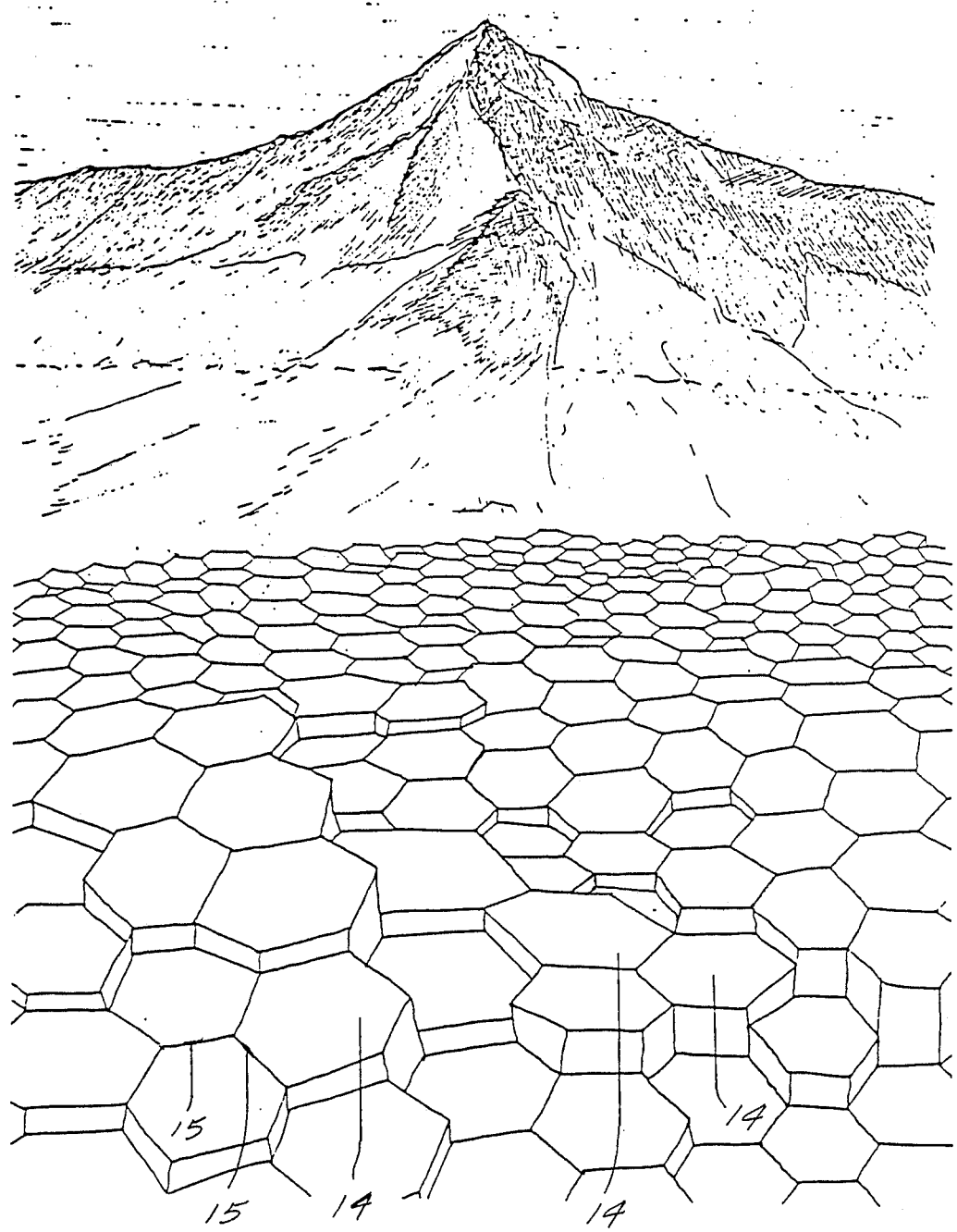
FIG. 8 is a sketch of a volcanic formation.

FIG. 8 shows a sketch of a volcanic formation, which has already been mentioned, and which constitutes a first-line point of attraction due to its great beauty. Similarly to the drawings of the model, 14 represents the prismatic units, 15 represents the flat or quasi-flat surfaces which join and establish cooperation between the hexagonal prismatic units, it being possible to note in said sketch the echeloning between the prismatic units.

Figure 9:
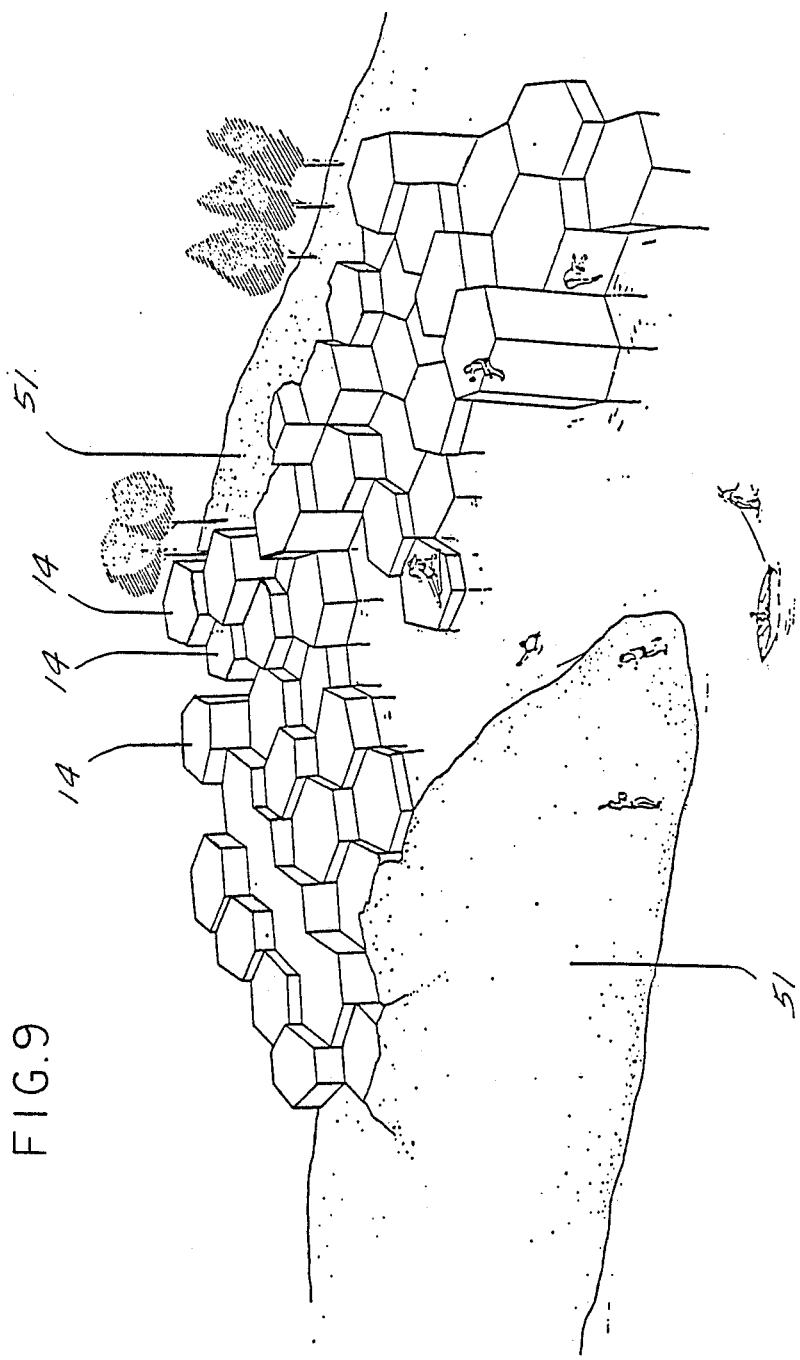
FIG. 9 is an isometric view of a further embodiment of the present invention.

FIG. 9 shows a seawall, pier, or basalt column landscape for recreational use, where 14 represents the hexagonal prismatic units which constitute usable echeloning, where 51 shows the joining systems in the manner of a cap, providing an overall esthetic and functional appearance.

It must be understood that the invention is not limited to the illustrations described and shown in this report, which are considered to merely illustrate the best ways of executing the invention, and which may be changed in shape, size, arrangement of parts, and functionality. On the contrary, the invention is supposed to include all the changes which are within the spirit and range, as they are defined by the following claims.

I claim:

1. A mosaic seawall comprising
   a fascine of vertically-elongated prismatic structural elements of generally identical cross-section substantially vertically disposed at least partially in a body of water,
   each of said elements having a closed base at each end and at least one lateral face therebetween abutting the lateral face of another of said elements to define a common lateral face extending substantially the full vertical extent of at least one of said abutting elements,
   said plurality of elements together further defining in cross-section at least one ocean-side cove section having a horizontally concave cross-section formed by a substantial number of said elements in non-intersecting disposition to diminish wave reflection therefrom, and
   an echeloned or vertically stepped mosaic crest providing a plurality of support surfaces at different levels adapted for functional use and joining said plurality of elements together to define in cross-section a stable water-impermeable mosaic to resist overturning or sliding under wave action.

2. The seawall of claim 1 wherein each of said elements is generally polygonal in cross-section.

3. The seawall of claim 2 wherein each of said elements is generally hexagonal in cross-section.

4. The seawall of claim 1 wherein each of said elements is a solid.

* * * * *